US012710124B2

(12) United States Patent
Fruit et al.

(10) Patent No.: US 12,710,124 B2
(45) Date of Patent: Aug. 18, 2026

(54) PIPELINE PIG CATCHER

(71) Applicant: ANTI-POLLUTION TECHNOLOGY, L.P., Austin, TX (US)

(72) Inventors: Darrel B. Fruit, Oklahoma City, OK (US); Jack G. Brewer, Chickasha, OK (US); John C. Kelsey, Stillwater, OK (US)

(73) Assignee: ANTI-POLLUTION INNOVATIONS, LP, McKinney, TX (US)

( * ) Notice: Subject to any disclaimer, the term of this patent is extended or adjusted under 35 U.S.C. 154(b) by 536 days.

(21) Appl. No.: 18/197,313

(22) Filed: May 15, 2023

(65) Prior Publication Data

US 2024/0384826 A1 Nov. 21, 2024

(51) Int. Cl.
*F16L 55/46* (2006.01)

(52) U.S. Cl.
CPC .................................... *F16L 55/46* (2013.01)

(58) Field of Classification Search
CPC .......... F16L 55/46; B08B 9/053; B08B 9/055; B08B 9/04; F16N 31/002
USPC .............................. 15/104.062; 220/571–573
See application file for complete search history.

(56) References Cited

U.S. PATENT DOCUMENTS 5,186,757 A 2/1993 Abney, Sr.
8,713,741 B2 5/2014 Fjerdingstad
9,052,049 B2 6/2015 Pargmann
9,371,216 B2 * 6/2016 Olivier .................... F16L 55/46
10,092,934 B2 10/2018 Thorn et al.
10,295,105 B2 5/2019 Poe et al.
10,668,513 B2 6/2020 Hill
10,837,590 B2 * 11/2020 Duke ...................... B08B 9/055
10,955,082 B2 3/2021 Genta
11,149,896 B2 * 10/2021 Golosky ................ F16L 55/30
2022/0074537 A1 3/2022 Al Shammari

FOREIGN PATENT DOCUMENTS

CN 1898318 A * 1/2007 ............. B29C 49/04
CN 106594456 A 4/2017
JP 4557444 B2 * 10/2010 ............... B05C 7/08

OTHER PUBLICATIONS

Inpipe Products, https://www.inpipeproducts.com/products/anti-static-pigging/, Feb. 13, 2023; 4 pages.
PCC Pollution Control Corp., Brochure, The Containment Stardard, 2020, 1 page.

* cited by examiner

*Primary Examiner* — Laura C Guidotti
(74) *Attorney, Agent, or Firm* — McAfee & Taft

(57) ABSTRACT

An apparatus and process used to catch a pipeline pig after use in a pipeline. The process involves locating the pig-catching apparatus adjacent the catcher station of a pipeline such that a pipeline pig coming out of the catcher station lands on a metal screen of the pig-catching apparatus. The pig-catching apparatus includes a vessel with a double wall configuration, the metal screen extending across an upper aperture such that the pipeline pig can be supported on the metal screen and fluids and small particulate matter can pass through the screen into the center chamber, and a plurality of feet integrally molded with the outer wall. The feet are located along the outer edge so as to extend outwardly therefrom and are spaced apart.

25 Claims, 6 Drawing Sheets

10
50
66
63
54
12
60
50

10
39
50
63
62
63
54
60
12
50

10
28
20
34
24
30
50
22
40
60
26
70
32
12
29
39

PIPELINE PIG CATCHER

FIELD OF THE INVENTION

The present disclosure relates to pipelines, for example, pipelines for transmitting fluids such as hydrocarbons. More specifically, this disclosure relates to devices and methods for catching or trapping a pig after use in a pipeline.

BACKGROUND OF THE INVENTION

Pipelines that carry fluids, for example, petroleum, natural gas, multi-phase fluids or other fluids, are internally inspected or cleaned by inserting a pig into the pipeline at a first point. The fluids flowing through the pipeline push the pig through the pipeline to a second point where the pig is removed from the pipeline or caught.

A pipeline pig can be any structure or device that can move through a pipeline to perform a function. For example, a pipeline pig can be implemented as a pipeline scraper to clean an interior of the pipeline. In another example, a pipeline pig can be implemented to swab, i.e., remove liquids or gases, from the pipeline. In a further example, a pipeline pig can be implemented to batch, i.e., separate different fluids in the pipeline. In additional examples, pipeline pigs can be implemented to perform intelligent operations such as monitoring and conveying information about a particular condition or performance of the pipeline.

Pipeline pigs can be launched into pipelines by providing launch stations or catcher stations (or both) at multiple points along the pipeline at which a pipeline pig will be inserted or removed (or both).

SUMMARY OF THE INVENTION

This disclosure primarily concerns catcher stations where the pig exits the pipeline and must be trapped or caught. In accordance with one embodiment there is provided a pig catcher for receiving a pipeline pig after use in a pipeline. The pig catcher comprises a vessel having a double wall configuration. The vessel includes an inner wall and an outer wall.

The inner wall has an inner bottom portion and an inner closed-wall portion extending upward from the inner bottom portion so as to define a center chamber terminating in an upper aperture.

The outer wall has an outer bottom portion and an outer closed-wall portion extending upward from the outer bottom portion. The outer bottom portion is flat, and the outer bottom portion and the outer closed-wall portion meet at an outer edge.

The inner wall and outer wall are configured so as to define an enclosed gap-chamber such that the gap-chamber surrounds at least the inner bottom portion and inner closed-wall portion.

A metal screen extending across the upper aperture such that the pipeline pig can be supported on the metal screen and fluids and small particulate matter can pass through the screen into the center chamber.

A plurality of feet integrally molded with the outer wall. The plurality of feet are located along the outer edge so as to extend outwardly therefrom and are spaced apart. Typically, at least a portion of the plurality of feet have a notch therein configured to receive a bar so as to prevent rotation and horizontal movement of the pig catcher.

In some embodiments, the outer wall and inner wall are made from an anti-static plastic. Alternatively or additionally, the pig catcher is grounded.

In some embodiments, the metal screen defines a clean-out aperture configured to allow the introduction of hoses used to clean out the center chamber.

In any of the above embodiments, the pig catcher can further comprise a lid configured to cover the upper aperture, wherein the lid has an upper surface defining at least two V-drains. The lid can have a swivel hinge mounted on the outer wall of the vessel, wherein the swivel hinge connects the cover to the vessel. Also, the lid can have a latch mounted on the outer wall of the vessel so as to oppose the hinge. The lid can also be made from anti-static plastic.

In accordance with another embodiment of the invention there is provided a process for catching a pipeline pig after use in a pipeline having a catcher station from which a pipeline pig comes out of a pipeline. The process comprising:

- placing a pig catching vessel adjacent to the catcher station of a pipeline such that a pipeline pig coming out of the catcher station lands on a metal screen of the pig catching vessel, wherein the pig catching vessel includes a double wall configuration including:
  - an inner wall having an inner bottom portion and an inner closed-wall portion extending upward from the inner bottom portion so as to define a center chamber terminating in an upper aperture; and
  - an outer wall having an outer bottom portion and an outer closed-wall portion extending upward from the outer bottom portion, wherein the outer bottom portion is flat, and the outer bottom portion and the outer closed-wall portion meet at an outer edge; and
  - wherein the inner wall and outer wall are configured so as to define an enclosed gap-chamber such that the gap-chamber surrounds at least the inner bottom portion and inner closed-wall portion; and
  - the metal screen extending across the upper aperture such that the pipeline pig can be supported on the metal screen and fluids and small particulate matter can pass through the screen into the center chamber; and
  - a plurality of feet integrally molded with the outer wall, wherein the plurality of feet are located along the outer edge so as to extend outwardly therefrom and are spaced apart;
- catching the pipeline pig coming out of the catcher station on the metal screen of the pig catching vessel; and
- allowing fluids and small particulate matter to pass through the screen into the center chamber.

The process can further comprise cleaning out the center chamber using a vacuum hose after the step of allowing fluids and small particles to pass through the screen. The metal screen defines a clean-out aperture configured to allow the introduction of the vacuum hose into the center chamber.

In the process, the step of the placing the pig catching vessel adjacent to the catcher station can comprise burying at least a portion of the pig catching vessel such that the feet are secured by dirt and/or concrete.

Additionally, the outer wall and inner wall are made from an anti-static plastic or can be grounded.

In the above embodiments of the process, at least a portion of the plurality of feet can have a notch, and the step of placing the pig catching vessel adjacent to the catcher station comprises driving a plurality of bars horizontally into the ground so that the each of the bars is received in a corresponding one of the notches such that rotation and horizontal movement of the pig catching vessel is prevented.

In the above embodiments, the step of placing the pig catching vessel adjacent to the catcher station cam comprise burying at least a portion of the pig catching vessel such that the feet are secured by dirt and/or concrete.

BRIEF DESCRIPTION OF THE DRAWINGS

The drawings included with this application illustrate certain aspects of the embodiments described herein. However, the drawings should not be viewed as exclusive embodiments. The subject matter disclosed herein is capable of considerable modifications, alterations, combinations, and equivalents in form and function, as will be evident to those skilled in the art with the benefit of this disclosure.

DESCRIPTION OF EXEMPLARY EMBODIMENTS

Figure 1:
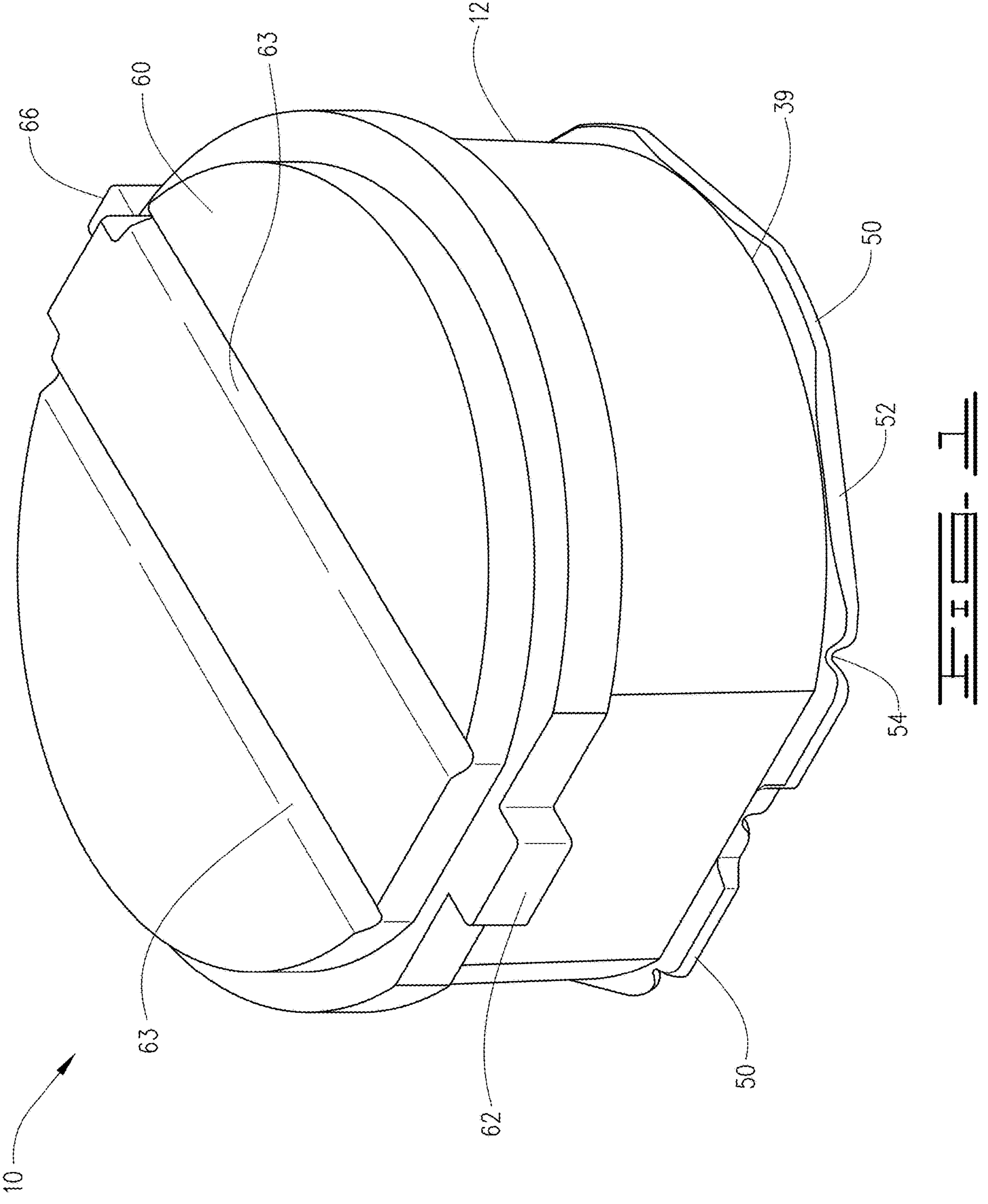
FIG. 1 is a top rear perspective view of an embodiment of the disclosed pig catcher.
Figure 2:
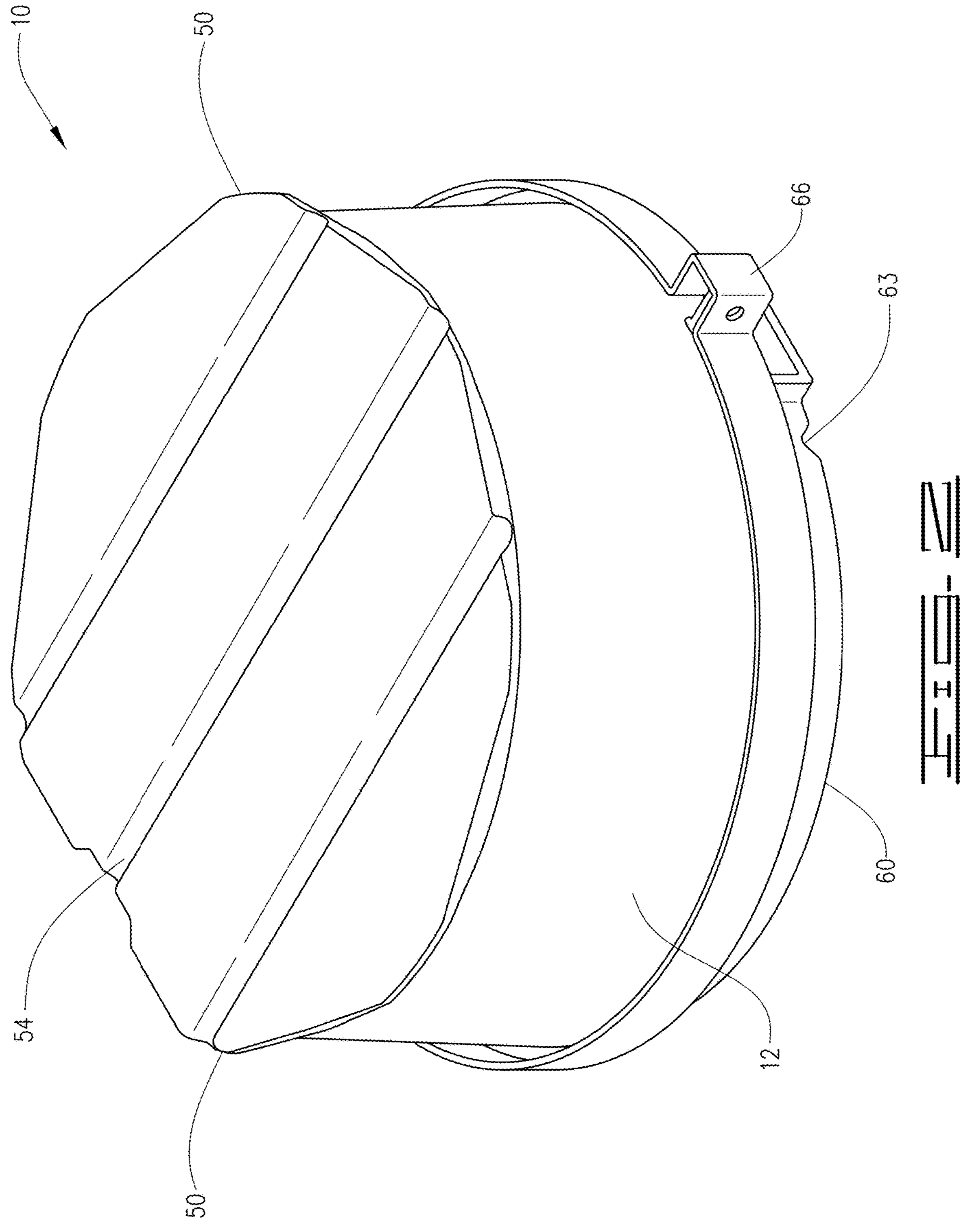
FIG. 2 is a bottom front perspective view of the embodiment of FIG. 1.
Figure 3:
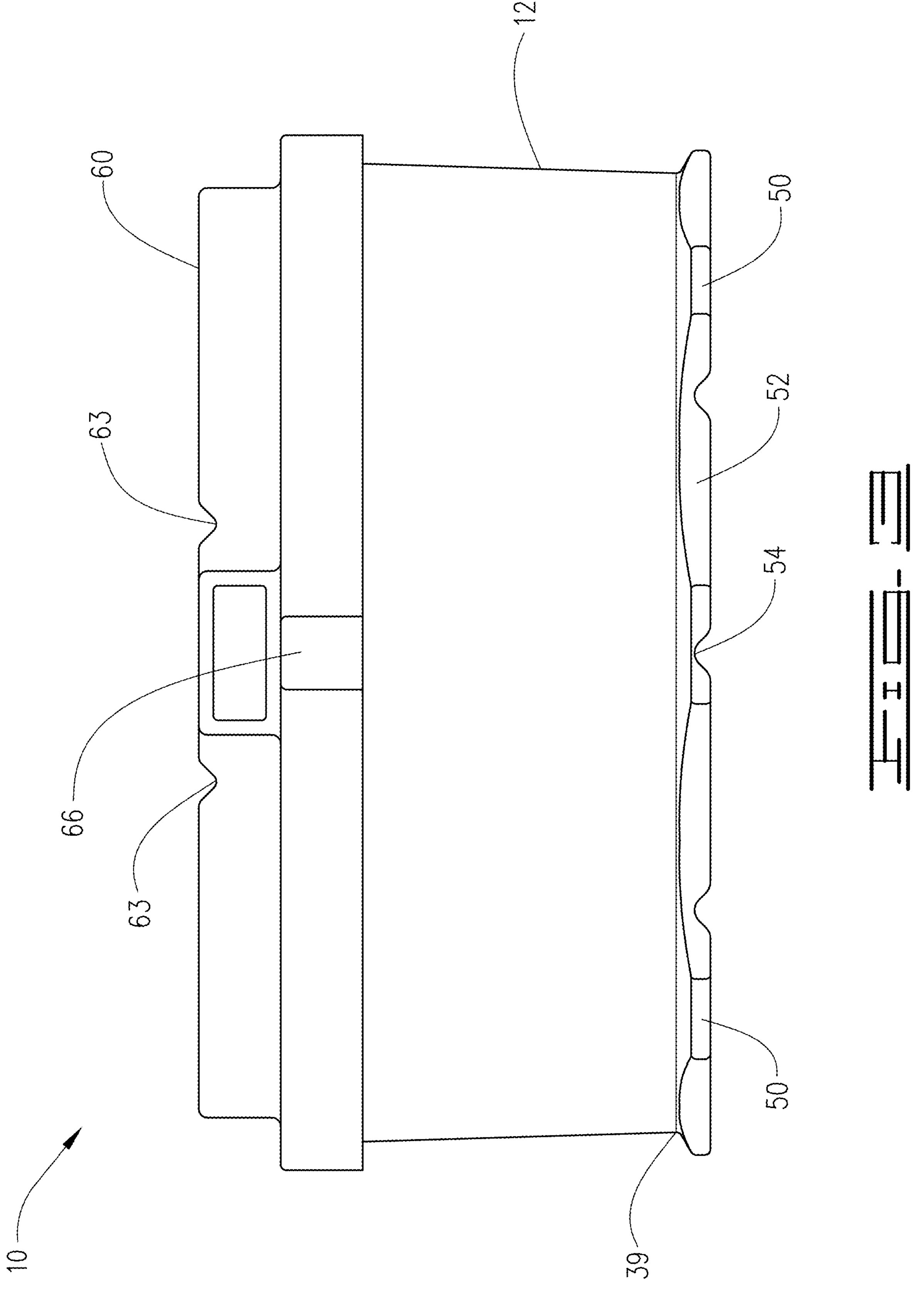
FIG. 3 is a front view of the embodiment of FIG. 1.
Figure 4:
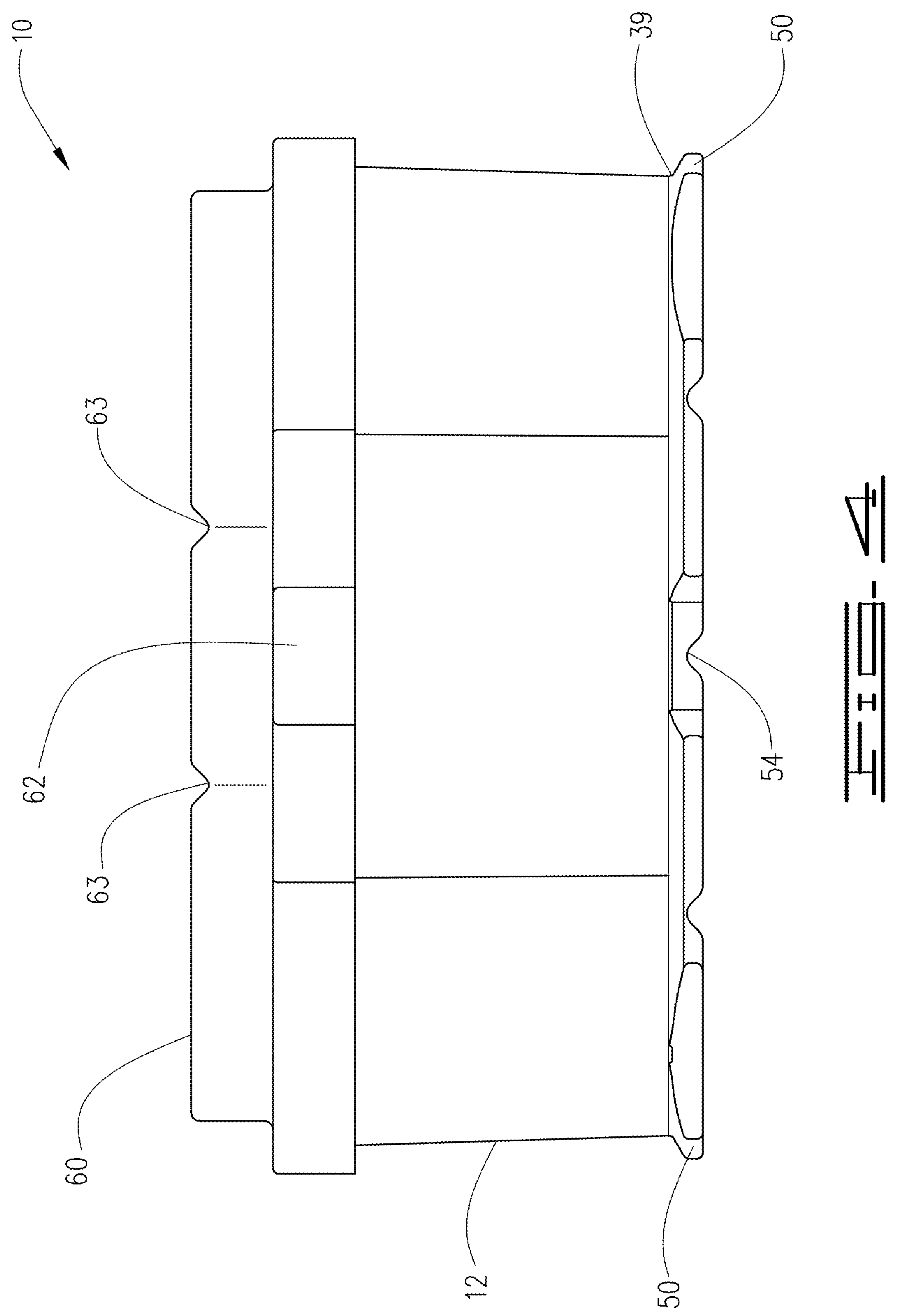
FIG. 4 is a rear view of the embodiment of FIG. 1
Figure 5:
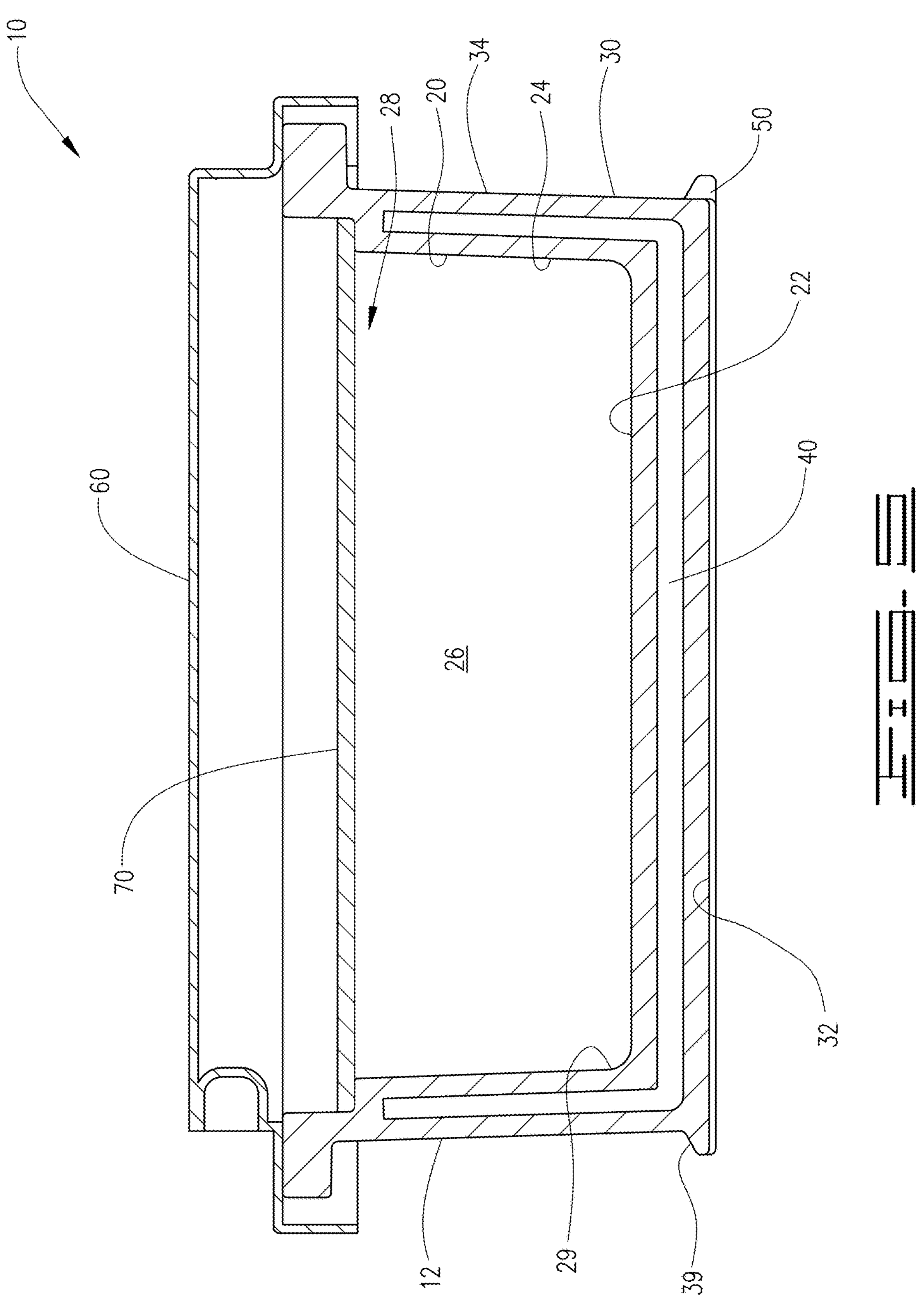
FIG. 5 is a cross-sectional view of an embodiment of the disclosure.

The present disclosure may be understood more readily by reference to this detailed description as well as to the examples included herein. In addition, numerous specific details are set forth in order to provide a thorough understanding of the embodiments and examples described herein. However, those of ordinary skill in the art will understand the embodiments and examples described herein can be practiced without these specific details. In other instances, methods, procedures and components have not been described in detail so as not to obscure the related relevant feature being described. Also, the description is not to be considered as limiting the scope of the embodiments described herein.

This disclosure concerns, among other things, catcher stations where the pig exits the pipeline and must be trapped or caught. FIGS. 1-6 show an apparatus for catching a pig after use in a pipeline in accordance with this disclosure. The pig catcher 10 generally comprises a vessel 12 having a double walled configuration with a lid 60. This double wall configuration can best be seen from FIG. 5, where in the vessel has an inner wall 20 and an outer wall 30. Generally, inner wall 20 and outer wall 30 will be integrally molded together to form this double wall configuration. The inner wall, outer wall and/or lid can be manufactured of antistatic plastic material. In addition to the antistatic plastic or in replacement to, the vessel and or lid can be grounded so as to reduce static electric charge. In some applications, the inner wall, outer wall and/or lid can be manufactured of composites or polymers, such as static dissipative composites or polymers, or out of conductive composites or polymers.

Inner wall 20 has an inner bottom portion 22 and an inner closed-wall portion 24 extending upward from inner bottom portion 22 so as to define a center chamber 26 terminating in an upper aperture 28. Upper aperture 28 can best be seen from FIG. 10, which illustrates a perspective view of the vessel 12 without the lid 60. Inner bottom portion 22 and inner closed-wall portion 24 meet an inner edge 29.

Outer wall 30 has an outer bottom portion 32 and an outer closed-wall portion 34 extending upward from outer bottom portion 32. Outer bottom portion 32 is typically is flat. Outer bottom portion 32 and the outer closed-wall portion 34 meet at an outer edge 39. As will be understood from the figures, inner closed-wall portion 24 and outer closed-wall portion 34 are closed in that their circumference or outer perimeter is closed. That is, a cross-section of inner closed-wall portion 24 or outer closed-wall portion 34 taken along a horizontal line would reveal a closed geometric shape to the relevant wall.

In some applications, inner wall 20 and outer wall 30 are configured in relation to one another so as to define an enclosed gap-chamber 40, that is space or chamber between the inner wall 20 and outer wall 30 which does not have plastic material or other fill material in it. (Though in some applications the chamber can have a fill material in it, typically different than the material forming the walls.) Gap-chamber 40 surrounds at least the inner bottom portion 22 and at least partially surrounds inner closed-wall portion 24, though it may have spacers or supports (not shown) therein to maintain the position of the two walls relative to each other. Generally at the side walls, the width of gap-chamber 40 will be from about 2 to about 15 percent (or from about 5 to about 12 percent) of the width of the outer wall 30. Generally under the inner bottom portion 22, the height of the gap-chamber 40 will be form about 2 to about 15 percent (or from about 5 to about 12 percent of the height of the outer wall 30.

Referring now to FIGS. 1-4, a plurality of feet 50 are spaced around outer wall 30 at edge 39. Feet 50 are located along edge 39 so as to extend radially outwardly therefrom. Typically, the feet are spaced apart so as to form the outward projection feet 50 alternating with areas without feet and only having edge 39. In the illustrated embodiment, the spaces are formed by arc feature 52 between feet 50. It has been found that such a plurality of feet 50, especially when integrally molded with outer wall 30 at edge 39, make a more secure based for anchoring vessel 12 with less occurrence of the feet separating from the vessel.

Additionally, in embodiments, at least a portion of the plurality of feet 50 have a notch 54 therein configured to receive a rebar so as to prevent rotation and horizontal movement of the pig catcher 10.

Lid 60 is configured to cover the upper aperture 28. Lid 60 has an upper surface 62 which can have one or more V-drains to channel rain and moister from pig catcher 10. Typically, upper surface 62 will have at least two V-drains 63. Lid 60 can be attached to vessel 12 by a swivel hinge located at 64 and mounted on outer wall 30 of vessel 12. The swivel hinge connects the cover to the vessel 12 and provides for lateral movement of the lid 60 with respect to vessel 12. Further, a latch 66 can be mounted on the outer wall 30 of the vessel 12 so as to oppose hinge 64. Latch 66 provides a means of securing the lid 60 closed. For example, latch 66 can comprise a hub on the lid 60 and a tab on the vessel 12, which can be secured together by putting a lock or bolt through aligning apertures on the hub and lid.

Figure 6:
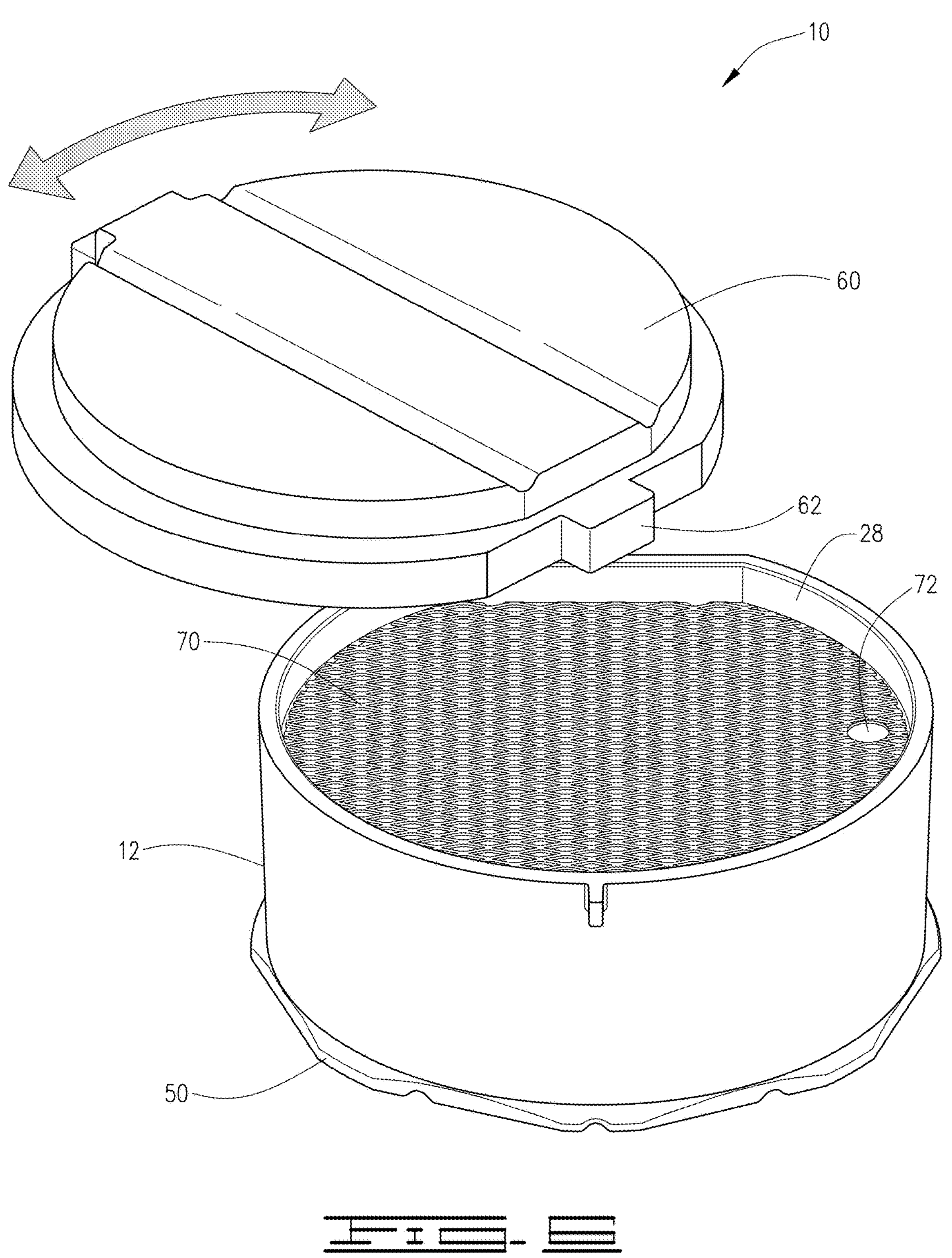
FIG. 6 is a perspective view of an embodiment with the lid open.

As can be best seen by FIG. 6, a metal screen 70 extends across the upper aperture 28 such that the pipeline pig can be supported on the metal screen 70 and fluids and small particulate matter can pass through the screen 70 into the center chamber 26. In some embodiments, metal screen 70 defines a clean-out aperture 72 configured to allow the introduction of hoses used to clean out the center chamber 26. Metal screen 70 can be supported by braces or support bars (not shown) extending across aperture 28.

The above described embodiments can be used in a process for catching a pipeline pig after use in a pipeline, wherein the pipeline has a catcher station from which a pipeline pig comes out of a pipeline. The process comprises placing the pig-catching vessel adjacent to the catcher station of a pipeline such that a pipeline pig coming out of the catcher station lands on the metal screen of the pig catching vessel.

The placement of the pig catching vessel can include burying at least a portion of the pig catching vessel such that the feet are secured by dirt and/or concrete. Alternatively or in addition to securing the feet with dirt and/or concrete, the placement of the pig catching vessel adjacent to the catcher station can include driving a plurality of bars horizontally into the ground so that the each of the bars is received in a corresponding one of the notches of the feet such that rotation and horizontal movement of the pig catching vessel is prevented.

After placement, the process includes catching the pipeline pig coming out of the catcher station on the metal screen of the pig catching vessel, and allowing fluids and/or small particulate matter to pass through the screen into the center chamber. Afterwards, the pig can be retrieved from the catcher.

Further, the process can include cleaning fluids and/or small particulate matter out the center chamber using a vacuum hose after the step of allowing fluids and/or small particles to pass through the screen. The cleaning out can be done by introducing a vacuum hose into the clean-out aperture of the metal screen so that the hose accesses the center chamber.

Other embodiments of the current invention will be apparent to those skilled in the art from a consideration of this specification or practice of the invention disclosed herein. Thus, the foregoing specification is considered merely exemplary of the current invention with the true scope thereof being defined by the following claims.

Therefore, the present systems and methods are well adapted to attain the ends and advantages mentioned, as well as those inherent therein. Any examples disclosed above are illustrative only, as the present treatment additives and methods may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered or modified, and all such variations are considered within the scope and spirit of the present treatment additives and methods. While compositions and methods are described in terms of "comprising," "containing," "having," or "including" various components or steps, the compositions and methods can also, in some examples, "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A pig catcher for receiving a pipeline pig after use in a pipeline, the pig catcher comprising:

a vessel having a double wall configuration including:

an inner wall having an inner bottom portion and an inner closed-wall portion extending upward from the inner bottom portion so as to define a center chamber terminating in an upper aperture; and an outer wall having an outer bottom portion and an outer closed-wall portion extending upward from the outer bottom portion, wherein the outer bottom portion is flat, and the outer bottom potion and the outer closed-wall portion meet at an outer edge; and wherein the inner wall and outer wall are configured so as to define an enclosed gap-chamber such that the gap-chamber surrounds at least the inner bottom portion and inner closed-wall portion;

a metal screen extending across the upper aperture such that the pipeline pig can be supported on the metal screen and fluids and small particulate matter can pass through the screen into the center chamber; and a plurality of feet integrally molded with the outer wall, wherein the plurality of feet are located along the outer edge so as to extend outwardly therefrom and are spaced apart, and wherein at least a portion of the plurality of feet have a notch therein configured to receive a bar so as to prevent rotation and horizontal movement of the pig catcher.

2. The pig catcher according to claim 1, wherein the outer wall and inner wall are made from an anti-static plastic.

3. The pig catcher according to claim 1, wherein the pig catcher is grounded.

4. The pig catcher according to claim 1, wherein the metal screen defines a clean-out aperture configured to allow the introduction of hoses used to clean out the center chamber.

5. The pig catcher according to claim 1, further comprising:

a lid configured to cover the upper aperture, wherein the lid has an upper surface defining at least two V-drains;

a swivel hinge mounted on the outer wall of the vessel, wherein the swivel hinge connects the lid to the vessel; and a latch mounted on the outer wall of the vessel so as to oppose the hinge.

6. The pig catcher according to claim 5, wherein:

at least a portion of the plurality of feet have a notch therein configured to receive a bar so as to prevent rotation and horizontal movement of the pig catcher; and the metal screen defines a clean-out aperture configured to allow the introduction of hoses used to clean out the center chamber.

7. The pig catcher according to claim 6, wherein the outer wall and inner wall are made from an anti-static plastic.

8. The pig catcher according to claim 6, wherein the pig catcher is grounded.

9. A process for catching a pipeline pig after use in a pipeline having a catcher station from which a pipeline pig comes out of a pipeline, the process comprising:

placing a pig catching vessel adjacent to the catcher station of a pipeline such that a pipeline pig coming out of the catcher station lands on a metal screen of the pig catching vessel, wherein the pig catching vessel includes:

a double wall configuration including:

an inner wall having an inner bottom portion and an inner closed-wall portion extending upward from the inner bottom portion so as to define a center chamber terminating in an upper aperture; and an outer wall having an outer bottom portion and an outer closed-wall portion extending upward from the outer bottom portion, wherein the outer bottom portion is flat, and the outer bottom potion and the outer closed-wall portion meet at an outer edge; and wherein the inner wall and outer wall are configured so as to define an enclosed gap-chamber such that the gap-chamber surrounds at least the inner bottom portion and inner closed-wall portion; and the metal screen extending across the upper aperture such that the pipeline pig can be supported on the metal screen and fluids and small particulate matter can pass through the screen into the center chamber, wherein the metal screen defines a clean-out aperture configured to allow the introduction of a vacuum hose into the center chamber; and a plurality of feet integrally molded with the outer wall, wherein the plurality of feet are located along the outer edge so as to extend outwardly therefrom and are spaced apart;

catching the pipeline pig coming out of the catcher station on the metal screen of the pig catching vessel;

allowing fluids and small particulate matter to pass through the screen into the center chamber; and cleaning out the center chamber using the vacuum hose after the step of allowing fluids and small particles to pass through the screen.

10. The process according to claim 9, wherein the placing the pig catching vessel adjacent to the catcher station comprises burying at least a portion of the pig catching vessel such that the feet are secured by dirt and/or concrete.

11. The process according to claim 9, wherein the outer wall and inner wall are made from an anti-static plastic.

12. The process according to claim 9, further comprising grounding the pig catcher vessel.

13. The process according to claim 9, wherein at least a portion of the plurality of feet have a notch, and wherein the placing the pig catching vessel adjacent to the catcher station comprises driving a plurality of bars horizontally into the ground so that the each of the bars is received in a corresponding one of the notches such that rotation and horizontal movement of the pig catching vessel is prevented.

14. The process according to claim 13, wherein the placing the pig catching vessel adjacent to the catcher station comprises burying at least a portion of the pig catching vessel such that the feet are secured by dirt and/or concrete.

15. The process according to claim 14, further comprising cleaning out the center chamber using a vacuum hose after the step of allowing fluids and small particles to pass through the screen, wherein the metal screen defines a clean-out aperture configured to allow the introduction of the vacuum hose into the center chamber.

16. The process according to claim 15, wherein the outer wall and inner wall are made from an anti-static plastic.

17. The process according to claim 15, further comprising grounding the pig catcher vessel.

18. A pig catcher for receiving a pipeline pig after use in a pipeline, the pig catcher comprising:

a vessel having a double wall configuration including:

an inner wall having an inner bottom portion and an inner closed-wall portion extending upward from the inner bottom portion so as to define a center chamber terminating in an upper aperture; and an outer wall having an outer bottom portion and an outer closed-wall portion extending upward from the outer bottom portion, wherein the outer bottom portion is flat, and the outer bottom potion and the outer closed-wall portion meet at an outer edge; and wherein the inner wall and outer wall are configured so as to define an enclosed gap-chamber such that the gap-chamber surrounds at least the inner bottom portion and inner closed-wall portion;

a metal screen extending across the upper aperture such that the pipeline pig can be supported on the metal screen and fluids and small particulate matter can pass through the screen into the center chamber, wherein the metal screen defines a clean-out aperture configured to allow the introduction of hoses used to clean out the center chamber; and a plurality of feet integrally molded with the outer wall, wherein the plurality of feet are located along the outer edge so as to extend outwardly therefrom and are spaced apart.

19. The pig catcher according to claim 18, wherein at least a portion of the plurality of feet have a notch therein configured to receive a bar so as to prevent movement of the pig catcher.

20. The pig catcher according to claim 18, wherein the outer wall and inner wall are made from an anti-static plastic.

21. The pig catcher according to claim 18, wherein the pig catcher is grounded.

22. The pig catcher according to claim 18, further comprising:

a lid configured to cover the upper aperture, wherein the lid has an upper surface defining at least two V-drains;

a swivel hinge mounted on the outer wall of the vessel, wherein the swivel hinge connects the lid to the vessel; and a latch mounted on the outer wall of the vessel so as to oppose the hinge.

23. The pig catcher according to claim 22, wherein:

at least a portion of the plurality of feet have a notch therein configured to receive a bar so as to prevent rotation and horizontal movement of the pig catcher; and the metal screen defines a clean-out aperture configured to allow the introduction of hoses used to clean out the center chamber.

24. The pig catcher according to claim 23, wherein the outer wall and inner wall are made from an anti-static plastic.

25. The pig catcher according to claim 23, wherein the pig catcher is grounded.

* * * * *